United States Patent
Rao et al.

(10) Patent No.: US 12,436,584 B2
(45) Date of Patent: Oct. 7, 2025

(54) THERMALLY OPTIMIZED POWER DELIVERY

(71) Applicant: Intel Corporation, Santa Clara, CA (US)

(72) Inventors: Samantha Rao, Bengaluru (IN); Zhongsheng Wang, Portland, OR (US); Somvir Singh Dahiya, Bengaluru (IN); Chee Lim Nge, Beaverton, OR (US); Siang Yeong Tan, Bayan Lepas (MY); Chia-Hung S. Kuo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 17/540,550

(22) Filed: Dec. 2, 2021

(65) Prior Publication Data

US 2022/0091644 A1  Mar. 24, 2022

(51) Int. Cl.
*G06F 1/00* (2006.01)
*G01R 19/165* (2006.01)
*G06F 1/20* (2006.01)
*G06F 1/324* (2019.01)
*G06F 1/3296* (2019.01)

(52) U.S. Cl.
CPC ....... *G06F 1/206* (2013.01); *G01R 19/16566* (2013.01); *G06F 1/324* (2013.01); *G06F 1/3296* (2013.01)

(58) Field of Classification Search
CPC ........ G06F 1/206; G06F 1/324; G06F 1/3296; G06F 1/28; G01R 19/16566; G01R 31/40; Y02D 10/00
See application file for complete search history.

(56) References Cited

U.S. PATENT DOCUMENTS

| | | | |
|---|---|---|---|
| 5,640,059 A * | 6/1997 | Kammiller | B60L 3/04 307/64 |
| 6,714,891 B2 * | 3/2004 | Dendinger | G06F 1/206 702/132 |
| 7,586,281 B2 | 9/2009 | Cohen et al. | |
| 7,761,274 B1 | 7/2010 | Pippin | |

(Continued)

OTHER PUBLICATIONS

International Search Report and Written Opinion, PCT App. No. PCT/US2022/048670, Mar. 13, 2023, 13 pages.

*Primary Examiner* — Xuxing Chen
(74) *Attorney, Agent, or Firm* — NICHOLSON DE VOS WEBSTER & ELLIOTT LLP

(57) ABSTRACT

A first circuit to receive from a sensor a thermal condition of a voltage regulator while circuitry comprising the voltage regulator is to regulate delivery of power to a power domain having first and second components. The circuitry is to control a first power consumption rate of the first component based on a first parameter and control a second power consumption rate of the second component based on a second parameter. The first circuit monitors the thermal condition and generates an evaluation result based on a test criterion. A second circuit receives from the first circuit a signal based on the evaluation result. Based on the signal, the second circuit is to signal the circuitry to change the first parameter. An amount of any change to the second parameter based on the evaluation result is different than an amount of change to the first parameter based on the evaluation result.

21 Claims, 5 Drawing Sheets

(56) References Cited

U.S. PATENT DOCUMENTS

| | | | | |
|---|---|---|---|---|
| 7,925,902 B1* | 4/2011 | Radcliffe | ............... | G06F 1/206 |
| | | | | 702/132 |
| 8,635,470 B1* | 1/2014 | Kraipak | ............... | G06F 1/3243 |
| | | | | 713/320 |
| 9,575,537 B2 | 2/2017 | Ignowski et al. | | |
| 10,147,464 B1* | 12/2018 | Wen | ................... | G06F 11/3024 |
| 10,203,742 B2 | 2/2019 | Sizikov et al. | | |
| 2004/0123171 A1* | 6/2004 | Zhang | ..................... | G06F 1/26 |
| | | | | 713/322 |
| 2013/0100483 A1* | 4/2013 | Henry | ............... | G06K 15/1863 |
| | | | | 358/1.15 |
| 2015/0153821 A1* | 6/2015 | Chi | ..................... | G06F 1/3287 |
| | | | | 713/320 |
| 2015/0378407 A1* | 12/2015 | Yang | ................... | G06F 1/3296 |
| | | | | 713/300 |
| 2019/0324517 A1* | 10/2019 | Keceli | ................. | G06F 1/3275 |

\* cited by examiner

THERMALLY OPTIMIZED POWER DELIVERY

BACKGROUND

Computer devices and systems-on-a-chip (SoC) include one or more voltage regulators (VR) that generate a voltage signal at an appropriate level that is supplied to various components of the system. The various components of a system may be divided into multiple power domains, each power domain being supplied power by a dedicated VR.

Depending on the design, a VR may include resistors, capacitors, inductors, and transistors. When the VR is being operated, these components generate heat. In general, the more power the VR supplies, the more heat it generates. It is important that VRs are operated in such a way that the amount of heat generated by a VR stays within a design specification.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
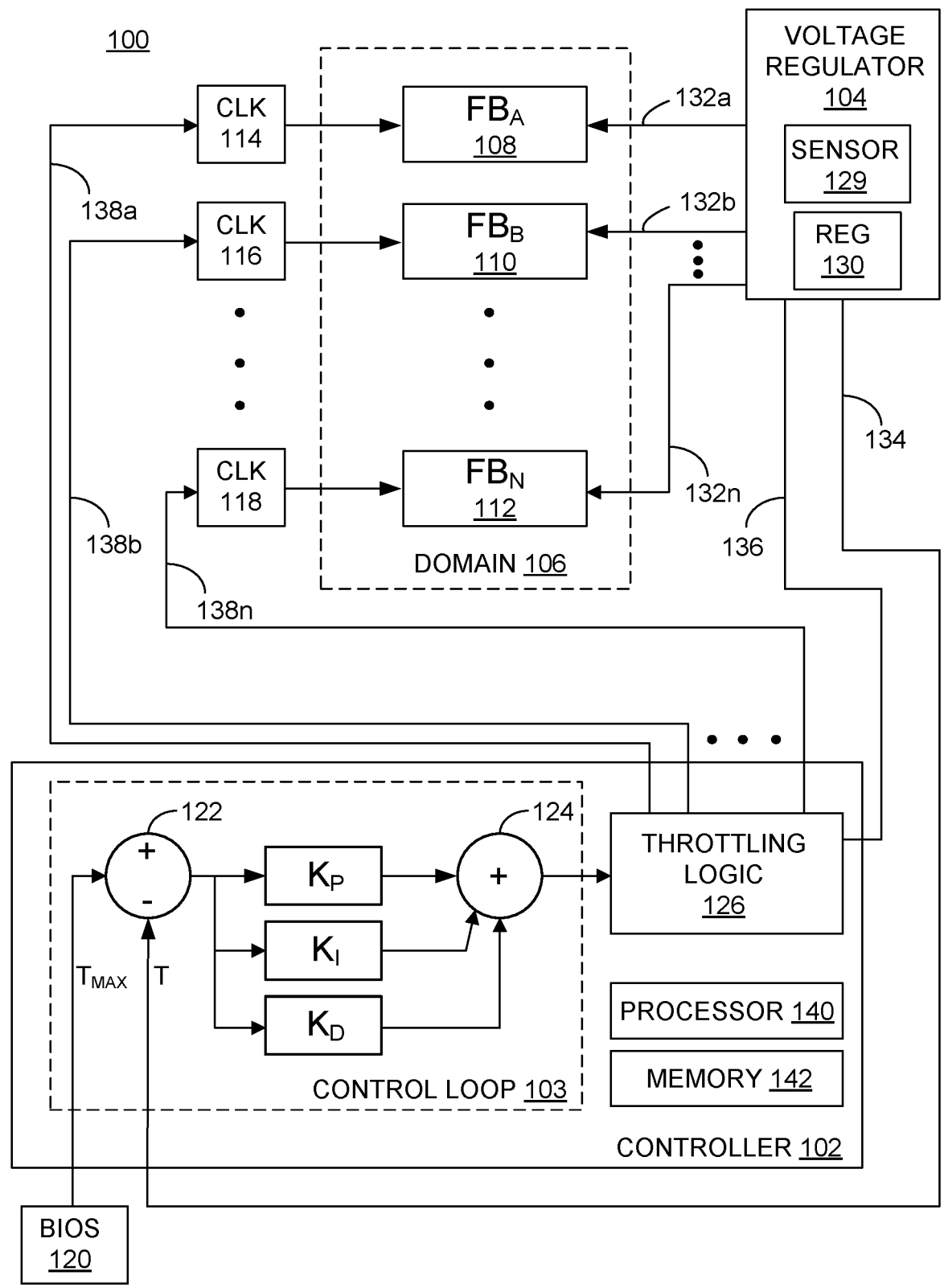
FIG. 1 illustrates a subsystem of a computer system for selectively changing power delivered to one or more functional blocks located in a power domain based on a thermal condition of a voltage regulator in accordance with some embodiments.

Embodiments relate generally to power delivery in a computer system and more particularly, but not exclusively, to controlling the temperature of a voltage regulator (VR) while the VR regulates the delivery of power to a power domain comprised of a plurality of functional blocks. In some embodiments, a VR supplies power to a particular domain and the temperature of the VR is controlled by reducing the power consumption of a selected functional block in the power domain, while, at the same time, not reducing the power consumed by another functional block in the domain. In some embodiments, the power consumption of a first functional block is changed by a first amount and the power consumption of a second functional block is changed by a second amount, wherein the amount of any change to the power consumption of the second functional block is different from the change to the power consumption of the first functional block. The amount by which power supplied to one or more selected functional blocks within a power domain is changed is determined based on a temperature of the VR. In some embodiments, one or more functional blocks may be selected for power reduction based on a priority scheme.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The terms "functional block," "functional unit," or "component" herein generally refer to any circuitry that performs a particular function. A "functional block" or "component" may be a unit of logic, circuit, cell, or chip layout that is reusable. A functional block is sometimes colloquially referred to as an IP (intellectual property) block. A few examples of functional blocks or components include processor cores, memories, caches, floating point processors, memory controllers, bus controllers, graphics processors, transceivers, network interface controllers, and display controllers. One or more portions of a larger functional block can themselves be designated as functional blocks. For example, an instruction execution unit and cache controller can be functional units or components of a processor functional unit. It should be appreciated that the foregoing examples are a non-exhaustive list of functional blocks.

The terms "power domain" or "domain" herein generally refer to logic areas or circuits that receive a specific power supply. A power domain is typically an area of an integrated circuit (IC) chip, although this is not essential. An IC may have multiple power domains. Each power domain in a system may have a dedicated VR providing power at a particular voltage. In addition, each power domain may include one or more functional blocks or components. The term "voltage domain" herein generally refers to one or more power stage circuitries in a VR that outputs a regulated voltage. In a VR that outputs two or more regulated voltages, the VR includes a voltage domain for each of the regulated output voltages.

Package power level (PL) control settings of PL1, PL2, PL3, PL4, and Tau allow a designer to configure a high-performance technology (e.g., Intel Turbo Boost Technology 2.0) to match the platform power delivery and package thermal solution limitations.

Power Limit 1 (PL1) is a threshold for average power. PL1 is generally set to equal to the Thermal Design Power (TDP). TDP relates to an ability of a cooler to dissipate heat. TDP is the minimum capacity of the CPU cooler required to get that guaranteed level of performance PL1 is the effective long-term expected steady state power consumption of a processor.

Power Limit 2 (PL2) is a threshold for average power that if exceeded, the PL2 rapid power limiting algorithms will attempt to limit the spike above PL2. PL2 is the short-term maximum power draw for a processor. This number is higher than PL1, and the processor goes into this state when a workload is applied, allowing the processor to use its turbo modes up to the maximum PL2 value. This means that if a processor vendor has defined a processor with a series of turbo modes, they will only work when PL2 is the driving variable for maximum power consumption. Turbo does not work in PL1 mode.

Power Limit 3 (PL3) is a threshold that if exceeded, the PL3 rapid power limiting algorithms will attempt to limit the duty cycle of spikes above PL3 by reactively limiting frequency. This is an optional setting.

Power Limit (PL4) is a limit that will not be exceeded. The PL4 power limiting algorithms will preemptively limit frequency to prevent spikes above PL4.

Turbo time Parameter (Tau) is an average constant used for PL1 exponential weighted moving average (EWMA) power calculation. Tau is a timing variable. It dictates how long a processor should stay in PL2 mode before hitting a PL1 mode. Note that Tau is not dependent on power consumption, nor is it dependent on the temperature of the processor (it is expected that if the processor hits a thermal limit, then a different set of super low voltage/frequency values are used and PL1/PL2 is discarded).

A processor in a computer system may have a predefined lowest power state or level, often referred to as "idle" or "throttling" mode. For example, a processor having a maximum clock frequency of 2.3 GHz may have a lowest power state of a plurality of power states in which the clock frequency is 800 MHz, e.g., 34.7% of maximum. The idle mode clock frequency varies depending on the particular processor.

PROHOT stands for "processor hot." PROCHOT is a bi-directional signal. Certain processors will toggle PROCHOT when the processor goes into throttling mode. Other processors may toggle PROCHOT when the processor goes into a lower, predetermined "safe" power state. An external source can also toggle PROHOT to force the processor into a lower power state, e.g., idle or throttling mode.

One external source that can toggle PROHOT is a VR. This may happen when a VR controller determines that the VR has reached a particular thermal threshold. The VR controller outputs a VRHOT signal, which forces the processor into throttling mode via the PROCHOT signal. Throttling the processor reduces the amount of power that the processor was drawing at the time the temperature in excess of the thermal threshold was sensed. The reduced power draw allows the VR to cool. When the VR controller determines that the VR has cooled to below the particular thermal threshold, the processor may resume processing at the previous frequency and voltage. However, throttling the processor using VRHOT/PROHOT is an aggressive way to reduce power. Since VR temperature comes down slowly, any subsequent promotion of frequency will quickly cause the VR controller to again output the VRHOT signal. Frequent switching between a normal or maximum operating frequency and a throttling mode frequency can cause performance to degrade.

According to various embodiments, a functional block in a power domain may be operated at a plurality of frequencies. As one non-limiting example, a functional block may be operated at any frequency between 600 MHz and 2.8 GHz. According to various embodiments, when a particular thermal condition of a VR is sensed, a power domain or a functional block within the power domain is not placed in a predetermined low power state, e.g., throttling mode. Instead, an amount of power supplied to one or more selected functional blocks within a power domain is changed by a particular amount that is determined based on VR temperature using a proportional, integral, derivative (PID) feedback mechanism, also referred to herein as a "control loop." The PID feedback mechanism samples VR temperature at closely-spaced time intervals and changes the amount of power provided to the selected functional block such that the VR temperature can stay near or approximate a VR threshold temperature.

The VR threshold temperature is selected based on reliability limits of the particular VR. As one example, if the maximum allowed temperature for a VR is 150° C. and the temperature where VRHOT is asserted is 150° C., a VR threshold temperature is 115° C.

The amount of power provided to the selected functional block may be changed, for example, by scaling frequency or voltage. In addition, power to a selected functional block may be reduced by power gating or isolation. According to various embodiments, when a difference between a threshold VR temperature and a temperature of the VR is sensed, an amount of change in power to be provided to the selected functional block is determined. The amount of change in power to be provided to the selected functional block is proportional to this temperature difference. An advantage of various embodiments is that it allows a processor to operate in a high power zone, e.g., PL2 or above, for a limited time. In contrast to some prior art methods, the time that a processor is allowed to operate in a high power zone is not a predetermined constant, e.g., tau, rather the time is directly related to VR temperature. Accordingly, various embodiments may permit a processor to operate in a high power zone for a period of time that is longer than a predetermined time limit for operating in the high power zone.

FIG. 1 illustrates a subsystem of a computer system for selectively changing power delivered to one or more functional blocks located in a power domain based on a thermal condition of a voltage regulator in accordance with some embodiments. Subsystem 100 may be incorporated into any suitable computer system. While only one power domain is shown in FIG. 1, it should be appreciated that two or more power domains may be provided in various embodiments.

Subsystem 100 comprises a controller 102 and a voltage regulator (VR) 104. VR 104 provides power to functional units or components $FB_A$ 108, $FB_B$ 110, $FB_N$ 112 in power domain 106. VR 104 provides respective voltage signals to functional units $FB_A$ 108, $FB_B$ 110, $FB_N$ 112 via electrical conductors 132a, 132b, 132n. In various embodiments, functional units $FB_A$ 108, $FB_B$ 110, $FB_N$ 112 are capable of operating at plurality of different voltage levels and clock frequencies. VR 104 is capable of providing distinct voltage signals to each of functional units $FB_A$ 108, $FB_B$ 110, $FB_N$ 112. For example, VR 104 is capable of simultaneously providing 0.8 V to $FB_A$ 108 and 1.2 V to $FB_B$ 110. In addition, VR 104 is capable of selectively applying power gating to a functional unit. For example, VR 104 can shut off power to $FB_A$ 108, while at the same time supplying power to $FB_B$ 110. VR 104 includes one or more thermal sensors 129 and a register 130 for storing a thermal value sensed by a thermal sensor 129. In some embodiments, a thermal value is a temperature. For example, the thermal value may be any of 176 (or more) temperature values in a range, e.g., from 0 to 175° C., and not simply a value indicating that the temperature is in one of four temperature ranges spanning multiple degrees, e.g., 0-100° C., 101-140° C., 141-150° C., and over 150° C. Granular temperature values are necessary to enable a PID control loop to smoothly regulate power deliver. In various embodiments, VR 104 includes a plurality of circuit devices (not shown), such as resistors, transistors, e.g. power field effect transistors (FET), inductors, capacitors, or diodes. In some embodiments, VR 104 comprises a controller and a driver. The type and design of VR 104 dictates which particular circuit devices are included in the voltage regulator. In some embodiments, a thermal sensor 129 and register 130 are provided for each of one or more specific circuit devices included in VR 104. For example, two thermal sensors 129 may be provided to sense temperatures of a FET and a controller included in VR 104, and two registers 130 may be provided to store the sensed temperatures of the FET and controller. In some embodiments, VR 104 is a power management integrated circuit (PMIC) on a separate IC from an IC on which the power domain 106 resides. In some embodiments, VR 104 is an Intel Mobile Voltage Positioning (IMVP) voltage regulator. In some embodiments, VR 104 is disposed on the same IC as the power domain 106.

Each of the functional units or components in domain 106 is provided with a clock signal. In the shown embodiment, clock generator 114 provides a clock signal to $FB_A$ 108, clock generator 116 provides a clock signal to $FB_B$ 110, and clock generator 118 provides a clock signal to $FB_N$ 112. In various embodiments, the frequency of clock signals provided by clock generators 114, 116, and 118 are independently adjustable. In various embodiments, functional units $FB_A$ 108, $FB_B$ 110, $FB_N$ 112 are capable of operating at plurality of different clock frequencies. The clock frequencies of functional units $FB_A$ 108, $FB_B$ 110, $FB_N$ 112 may be different from one another at the same time. As one example, clock generator 114 can provide a clock signal to $FB_A$ 108 at a first frequency, while at the same time clock generator 116 can provide a clock signal at one half of the first frequency to $FB_B$ 110. As another example, clock generator 114 can provide a clock signal to $FB_A$ 108 at a first frequency, while at the same time clock generator 116 can stop providing a clock signal to $FB_B$ 110.

In various embodiments, controller 102 is a power control unit (PCU) that executes instructions referred to as Pcode. In various embodiments, controller 102 includes a processor 140 and memory 142. In various embodiments, controller 102 includes a "control loop" 103 comprising one or more of elements 122, 124, $K_p$, $K_i$, and $K_d$. In addition, controller 102 includes throttling logic 126. In some embodiments, control loop 103 and throttling logic 126 are implemented in Pcode, which is executed in processor 140. In some embodiments, one or more of the elements 122, 124, 126, $K_p$, $K_i$, and $K_d$ in FIG. 1 are implemented by a central processing unit (CPU) of a computer system (not shown in FIG. 1) (or processor 210 shown in FIG. 2) in instructions understandable by the CPU. Pcode and instructions understandable by a CPU are examples of machine-readable instructions. These machine-readable instructions are stored in machine-readable storage media, e.g., a memory 142 internal to controller 102 or a memory used by a CPU (not shown in FIG. 1) of a computer system. In some embodiments, one or more of elements 122, 124, 126, $K_p$, $K_i$, and $K_d$ in FIG. 1 are implemented in circuits or circuitry.

In various embodiments, controller 102 is coupled with thermal sensor 129 in VR 104. In particular, controller 102 receives or reads from register 130 an indication of a thermal condition of VR 104. In some embodiments, controller 102 is coupled with VR 104 via bus 134, which may be a Serial Voltage Identification (SVID) bus. When it is desired to selectively change power delivered to one or more functional blocks located in a power domain based on a thermal condition of a voltage regulator, a thermal condition or temperature of VR 104 is provided to or read by a comparing element 122 at regular time intervals, e.g., every millisecond or every 500 microseconds. It may be desired to selectively change power delivered to one or more functional blocks when a processor is operating in a turbo mode, or when VR current or temperature cross a threshold; the selective power delivery function of controller 102 may be inactive at other times.

A test criterion is obtained from Basic Input/Output System (BIOS) 120 by controller 102. For example, BIOS 120 may program controller 102 with a test criterion, e.g., a maximum temperature limit, at boot up. In some embodiments, the test criterion may be stored in another suitable memory. The comparing element 122 generates an evaluation result or error value e(t) by comparing each temperature reading with the maximum temperature limit. In various embodiments, the test criterion or maximum temperature limit is different from the temperature at which a voltage regulator asserts a VRHOT signal to throttle a processor. For example, if VRHOT is asserted at 150° C., the test criterion temperature may be 115° C. Each evaluation result is input to components of a proportional/integral/derivative (PID) control mechanism comprising: a proportional component $K_p$, an integral component $K_i$, and a derivative component $K_d$. In an embodiment, the control mechanism is represented mathematically by the expression:

$$u(t) = K_p e(t) + K_i \int_0^t e(\tau)d\tau + K_d \frac{de(t)}{dt}$$

In some embodiments, only one or two of the control components are used. For example, in an embodiment, only the proportional component $K_P$ is used. A summing element 124 of the PID control mechanism generates a weighted sum of the outputs of the control components $K_P$, $K_I$, and $K_D$ to produce a control value or correction signal u(t). The control value is input to throttling logic 126.

The throttling logic 126 selects one or more functional blocks or components in domain 106 for power reduction. In some embodiments, one or more functional blocks may be selected for power reduction based on a priority scheme. For example, if a first component $FB_A$ 108 has a lower priority than a second component $FB_B$ 110, only the first component $FB_B$ 110 is selected for power reduction. As another example, if first and second components have a lower priority than a third component, both the first and second components are selected for power reduction, while power delivered to the third component is not changed. In some embodiments, functional blocks or components in a domain may have equal priority and a particular functional block is selected for power reduction on a round-robin basis. In some embodiments, two or more functional blocks may be selected for power reduction based on a tiered priority scheme. For example, first, second, and third functional blocks may have, respectively, highest, second highest, and lowest priorities. In one example of a tiered priority scheme, only the second and third functional blocks are selected for power reduction, while power provided to the first functional block is not disturbed. Further, the amount by which power is reduced to the third block is greater than the amount by which power is reduced to the second block based on the higher priority of the second block with respect to the third block.

For the one or more functional blocks or components in domain 106 selected for power reduction, in some embodiments, throttling logic 126 determines whether to reduce power by reducing clock frequency, supply voltage, or both. In some embodiments, throttling logic 126 determines to reduce power to a selected block using power gating or isolation. In embodiments in which clock frequency or supply voltage is scaled, throttling logic 126 determines an appropriate value for a scaling parameter to send to one or more of clock generators 114, 116, and 118, or VR 104. In clock scaling embodiments, throttling logic 126 applies a clock throttling ratio to the correction signal to determine a clock scaling parameter, and communicates a determined clock scaling parameter to a selected clock generator via one of electrical conductors 138a, 138b, 138n. In voltage scaling embodiments, throttling logic 126 applies a voltage throttling ratio to the correction signal, and communicates a determined voltage scaling parameter and selected functional block to VR 104 via electrical conductor 136.

Figure 2:
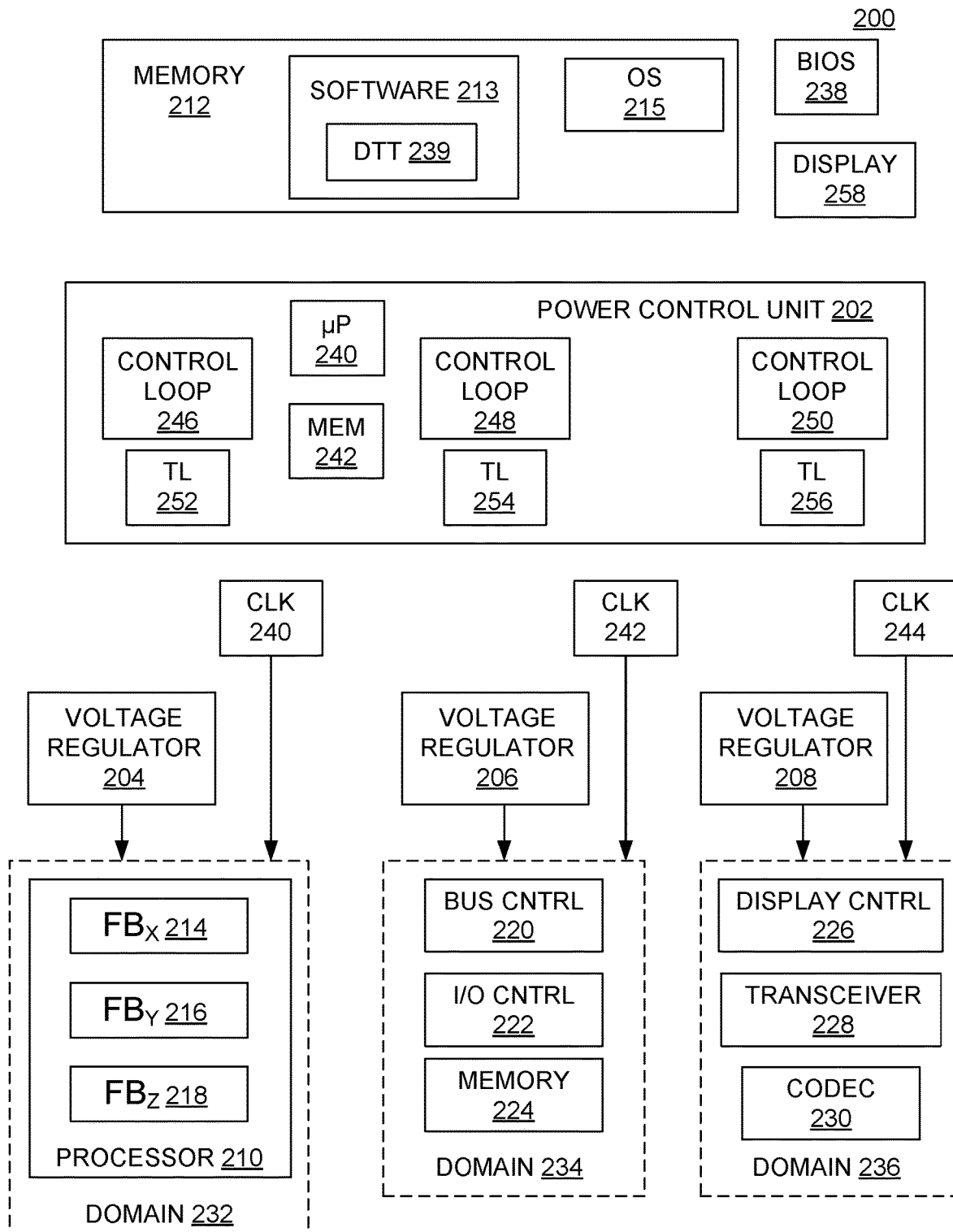
FIG. 2 illustrates a computing system for selectively changing power delivered to one or more functional blocks located in multiple power domains based on thermal conditions of multiple voltage regulators in accordance with some embodiments.

FIG. 2 illustrates a computing system for selectively changing power delivered to one or more functional blocks located in multiple power domains based on thermal conditions of multiple voltage regulators in accordance with some embodiments.

Computer system 200 includes power control unit 202, and VRs 204, 206, and 208. In addition, computer system 200 includes a processor 210 and a memory 212 for storing software 213 and operating system (OS) 215. Memory 212 may include volatile and non-volatiles memories. Computer system 200 also includes BIOS 238, and clock generators 240, 242, and 244. Various components of computer system 200 are placed in power domains 232, 234, and 236. In some embodiments, software 213 comprises dynamic tuning technology (DTT) software 239.

In the example of FIG. 2, processor 210 comprises functional units or components $FB_X$ 214, $FB_Y$ 216, $FB_Z$ 218. Processor 210 and its functional units are placed in power domain 232. A bus controller (CNTRL) 220, I/O controller 222, and memory 224 are placed in domain 234. A display controller 226, transceiver 228, and coder/decoder (CO-DEC) 230 are placed in domain 236. Bus controller 220, I/O controller 222, memory 224, display controller 226, transceiver 228, and CODEC 230 are examples of functional units or components. A display device 258 is coupled with the display controller 226.

VR 204 is associated with domain 232. VR 206 is associated with domain 234. VR 208 is associated with domain 236. VRs 204, 206, and 208 provide regulated voltage signals to the functional units in their respective associated domains. The functional units or components in the domains are capable of operating at a plurality of different voltage levels. VRs 204, 206, and 208 are capable of simultaneously providing distinct voltage signals to each of functional units in their respective domains. VRs 204, 206, and 208 each include one or more thermal sensors and registers for storing a sensed thermal value. VRs 204, 206, and 208 may be any suitable type of VR.

Clock generator 240 is associated with domain 232. Clock generator 242 is associated with domain 234. Clock generator 244 is associated with domain 236. Clock generators 240, 242, and 244 provide clock signals to the functional units in their respective associated domains. The functional units in the domains are capable of operating at plurality of different clock frequencies. Clock generators 240, 242, and 244 are capable of simultaneously providing distinct clock frequency signals to each of the functional units in their respective domains.

In various embodiments, power control unit (PCU) 202 includes a processor 210 (µP), a memory 212 (MEM), control loops 246, 248, and 250, and throttling logic (TL) 252, 254, and 256. In some embodiments, processor 210 executes Pcode embodying one or more control loops and throttling logic blocks. In some embodiments, one or more control loops and throttling logic blocks are implemented in circuits or circuitry. Each of the control loops 246, 248, and 250 comprise a comparing element 122, a summing element 124, $K_p$, $K_i$, and $K_d$ described herein with respect to controller 102 in FIG. 1. Each of the control loops 246, 248, and 250 can be substantially the same as control loop 103 described herein with respect to controller 102 in FIG. 1. Each of TL 252, 254, and 256 can be substantially the same as throttling logic 126 described herein with respect to controller 102 in FIG. 1. In the example shown in FIG. 2, control loop 246 and TL 252 control the temperature of VR 204 by regulating delivery of power to domain 232, control loop 248 and TL 254 control the temperature of VR 206 by regulating delivery of power to domain 234, and control loop 250 and TL 256 control the temperature of VR 208 by regulating delivery of power to domain 236.

In various embodiments, processor 210 executes instructions, e.g., software 213, embodying one or more of control loops 246, 248, and 250, and throttling logic (TL) 252, 254, and 256. In particular, processor 210 receives or reads an indication of a thermal condition of each of VRs 204, 206, and 208. Processor 210 generates an evaluation result or error value e(t) by comparing each temperature reading with a maximum temperature limit. Processor 210 executes instructions of PID control mechanism to operate on the evaluation result and generates a weighted sum of the outputs of the control mechanism components. Processor 210 may select a functional unit in a power domain for power reduction and determine an appropriate value for a scaling parameter to send to a clock generator or a VR. Processor 210 may also selectively apply power gating to a functional unit.

In some embodiments, processor 210 executes dynamic tuning technology (DTT) software 239 from Intel, which receives data from sensors and allows a processor to stay in a higher power mode for a longer time period than can be achieved without DTT. DTT receives data comprising temperature, power, mode of usage, and current CPU state. DTT uses this sensor data to change CPU power levels to a maximum level specified by a system designer. In embodiments in which processor 210 executes DTT, the techniques disclosed herein for selectively changing power delivered to one or more functional blocks located in a power domain based on a thermal condition of a voltage regulator may be incorporated in DTT 239. Specifically, in some embodiments, DTT 239 may include control loops 246, 248, and 250, and throttling logic (TL) 252, 254, and 256.

Computer system 200 comprises a number of components not shown in FIG. 2. These components are well known to one or ordinary skill in the art and omitted from the figure so as to not obscure the inventive concepts disclosed herein. In some embodiments, computer system 200 comprises a system on a chip (SoC). Computer system 200 may include peripheral devices, such as input and output devices, e.g., keyboards, mice, microphones, cameras, touch pad, touch screens, scanners, displays, and speakers. Peripheral devices may also include memory and other devices. The foregoing is a non-exhaustive list of components that may be included in computer system 200.

Figure 3:
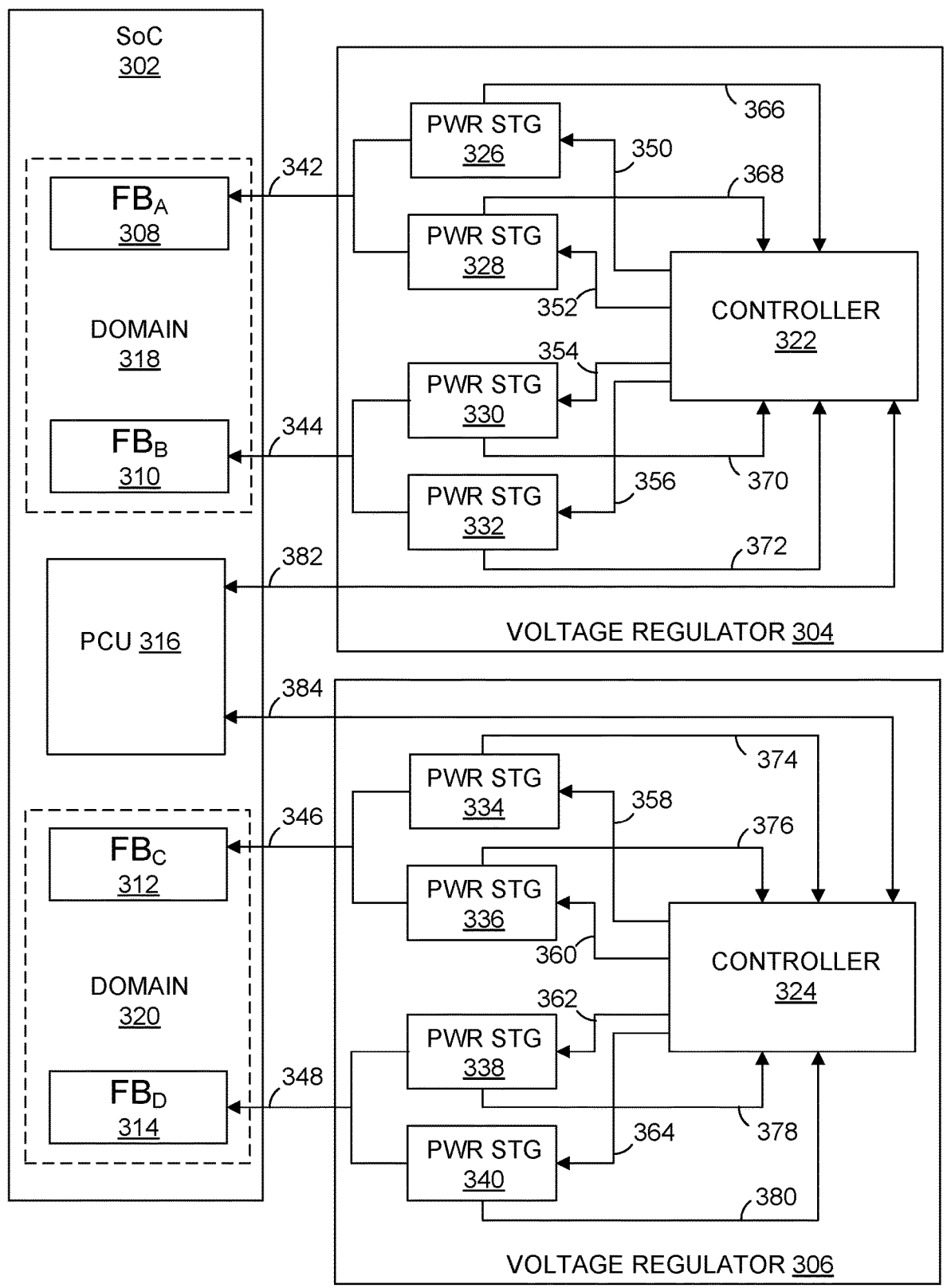
FIG. 3 illustrates a computing system for selectively changing power delivered to one or more functional blocks of a System-on-Chip (SoC) based on a thermal condition of a voltage regulator having multiple power stages in accordance with some embodiments.

FIG. 3 illustrates a computing system 300 for selectively changing power delivered to one or more functional blocks of a system-on-a-chip (SoC) based on a thermal condition of a voltage regulator having multiple power stages in accordance with some embodiments. FIG. 3 shows an embodiment in which a controller in a VR includes logic or circuitry to monitor temperatures of each of two or more power stages in the VR that together output a single regulated voltage signal. The VR includes logic or circuitry to select which of the two or more power stages has a worst-case temperature, e.g., a highest temperature, and to provide the worst-case temperature value to a control loop that selectively changes power delivered to a functional block. The system 300 comprises an SoC 302, and VRs 304 and 306.

The SoC 302 includes functional blocks or components 308, 310, 312, and 314. In addition, SoC 302 includes a power control unit (PCU) 316. In an embodiment, SoC 302 comprises power domains 318 and 320. Functional blocks 308 and 310 are in power domain 318 and functional blocks 312 and 314 are in power domain 320. In an embodiment, VR 304 provides power to power domain 318 and VR 306 provides power to power domain 320.

In the shown embodiment, VR 304 and VR 306 each supply two regulated output voltage signals, i.e., VR 304 and VR 306 each comprise two voltage domains. Specifically, VR 304 supplies power on electrical conductors 342 and 344, and VR 306 supplies power on electrical conductors 346 and 348. Two output voltage signals are shown to simplify the example in FIG. 3. In other embodiments, VR 304 and VR 306 may each supply three or more regulated output voltage signals.

Each of the output supply voltages on electrical conductors 342, 344, 346, and 348 is associated with a voltage domain of respective VRs 304 and 306. VR 304 comprises a first voltage domain that comprises power stages (PWR STG) 326 and 328, and which is associated with output supply voltage on electrical conductor 342. In addition, VR 304 comprises a second voltage domain that comprises power stages 330 and 332, and which is associated with output supply voltage on electrical conductor 344. VR 306 comprises a first voltage domain that comprises power stages 334 and 336, and which is associated with output supply voltage on electrical conductor 346. In addition, VR 306 comprises a second voltage domain that comprises power stages 338 and 340, and which is associated with output supply voltage on electrical conductor 348. It should be appreciated that while each of the voltage domains shown in FIG. 3 includes two power stages, in other embodiments, a voltage domain may include three or more power stages.

Each of the power stages 326, 328, 330, 332, 334, 336, 338, and 340 include one or more power switches, e.g. power FETs, and an inductor. A power stage can also be referred to as a "phase." In some embodiments, a VR is a buck regulator having "n" phases, wherein in steady-state operation the n phases are active at spaced-apart intervals of 360°/n. As shown in the FIG. 3, multiple phases or power stages are combined to provide a single output supply voltage. For example, power stages 326 and 328 are combined to provide output supply voltage on electrical conductor 342 to functional block 308 in domain 318.

In various embodiments, each controller in the VRs read the temperature of each power stage in a voltage domain. Controller 322 reads the temperature of power stage 326 via electrical conductor 366 and the temperature of power stage 328 via electrical conductor 368. In addition, controller 322 reads the temperature of power stage 330 via electrical conductor 370 and the temperature of power stage 332 via electrical conductor 372. Similarly, Controller 324 reads the temperature of power stage 334 via electrical conductor 374 and the temperature of power stage 336 via electrical conductor 376. In addition, controller 324 reads the temperature of power stage 338 via electrical conductor 378 and the temperature of power stage 340 via electrical conductor 380.

In various embodiments, each controller in the VRs transmits the temperature data of the power stages to SoC 302. Controller 322 transmits temperature data to PCU 316 in SoC 302 via electrical conductor 382. Controller 324 transmits temperature data to PCU 316 in SoC 302 via electrical conductor 384. In various embodiments, controllers 322 and 324 include logic or circuitry for determining a worst-case temperature that each reads from the respective voltage domains and power stages in its VR. In various embodiments, controllers 322 and 324 transmit worst-case temperature information to PCU 316.

PCU 316 includes Pcode or circuitry implementing control loops and throttling logic for each voltage domain in each VR. Control loops and throttling logic in PCU 316 are constructed according to the principles described herein. For example, control loops and throttling logic in PCU 316 may be substantially the same as control loop 103 and throttling logic 126. As described with respect to control loop 103 and throttling logic 126, if the temperature reported for a voltage domain is above a threshold, the control loop and throttling logic for the voltage domain cause a control signal to be transmitted to reduce power supplied to a selected functional block in power domain 318 or 320 in SoC 302. The power to the selected block can be reduced by lowering clock frequency, lowering supply voltage, power gating, or isolation. In the case of lowering supply voltage, PCU 316 transmits a control signal to controller 322 or 324 via electrical conductor 382 or 384. The control signal specifies the voltage domain supplying power to the selected functional block and a scaling parameter.

Controllers 322 and 324 control the amount of power each of the power stages output. Controller 322 controls the amount of power output by power stages 326 and 328 by transmitting a signal on respective electrical conductors 350 and 352. In addition, controller 322 controls the amount of power output by power stages 330 and 332 by transmitting a signal on respective electrical conductors 354 and 356. Similarly, controller 324 controls the amount of power output by power stages 334 and 336 by transmitting a signal on respective electrical conductors 358 and 360. In addition, controller 324 controls the amount of power output by power stages 338 and 340 by transmitting a signal on respective electrical conductors 362 and 364. When the temperature reported for a voltage domain is above a threshold and PCU 316 transmits a control signal specifying a voltage domain supplying power to a selected functional block and a scaling parameter, the controller 322 or 324 receiving the control signal uses one or more appropriate electrical conductors 350, 352, 354, 356, 358, 360, 362, and 364 to change an amount of power output by one or more of the power stages 326, 328, 330, 332, 334, 336, 338, and 340 corresponding with the control signal from the PCU 316.

Figure 4:
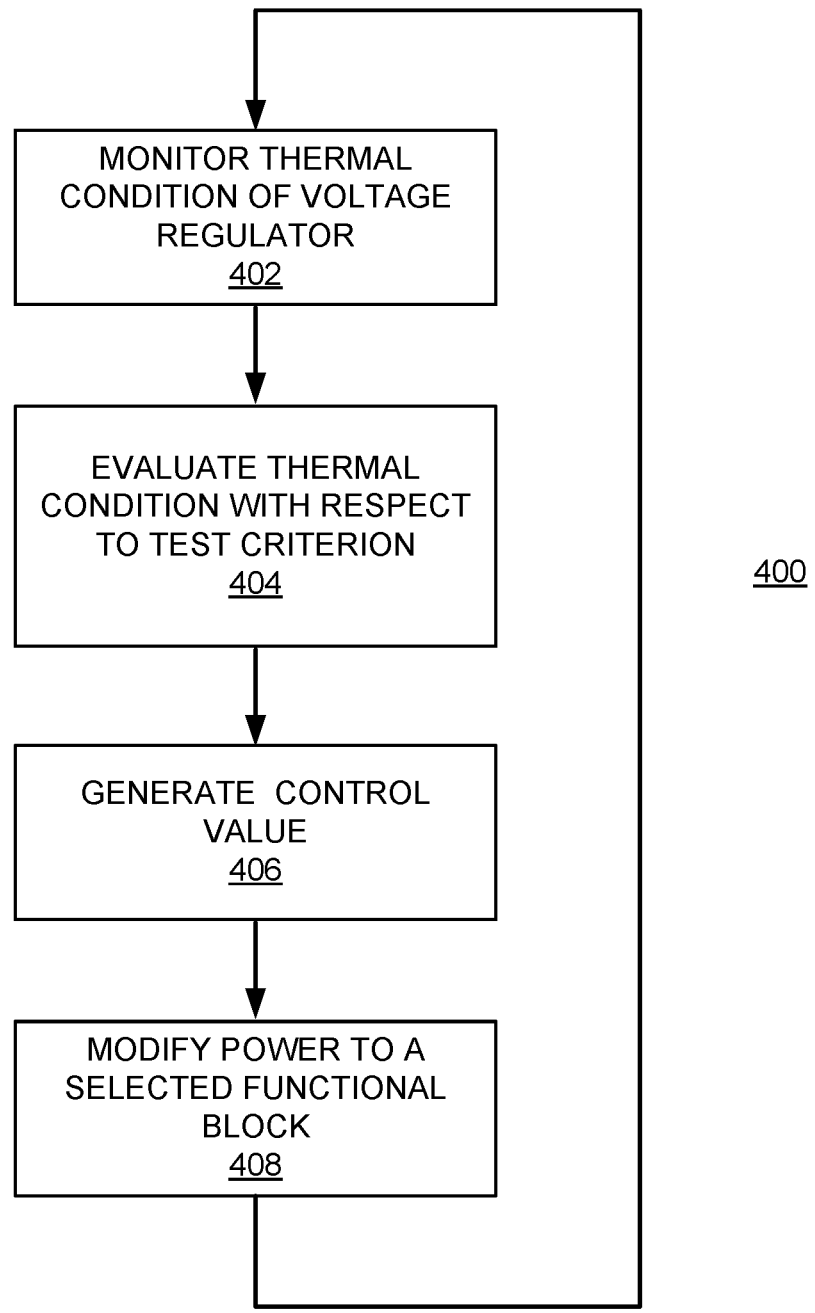
FIG. 4 illustrates a flow diagram of a process for selectively changing power delivered to one or more functional blocks located in a power domain based on a thermal condition of a voltage regulator according to various embodiments.

FIG. 4 illustrates a flow diagram of a process 400 for selectively changing power delivered to one or more functional blocks located in a power domain based on a thermal condition of a voltage regulator according to various embodiments.

The sequence of actions of process 400 here can be modified. For example, some actions or processes can be performed in parallel and some actions can be performed out of order. In some embodiments, an action or operation can be omitted, in whole or in part. In some embodiments, process 400 is implemented in hardware, software, or a combination of hardware and software. In some embodiments, process 400 is implemented by computer subsystem 100 or computer system 200. While various embodiments are described with reference to computer subsystem 100, process 400 is applicable to any suitable computer system.

It is not essential that the process 400 be employed for the entire time that a computer system is in an operational mode. In some embodiments, if a thermal condition of a voltage regulator is at or below a safe threshold, the process 400 is not performed. For example, if the thermal condition of the VR is at or below 70% or 80% of a test criterion, e.g., 115° C., the process 400 is not performed. When the thermal condition of the VR is above the safe threshold, e.g., 92° C., the process 400 is performed. In some embodiments, the process 400 is only employed when current supplied by a VR is above a threshold or during a turbo mode condition.

Referring to FIG. 4, at 402, a thermal condition of VR 104 is monitored. For example, controller 102 receives or reads from register 130 an indication of a thermal condition of VR 104 at regular time intervals. In an embodiment, the thermal condition is a temperature of VR 104. In an embodiment, the thermal condition is a temperature of a circuit device within VR 104. The thermal condition read from register 130 is sufficiently granular such that it can effectively be used in a PID control loop to smoothly regulate power delivery to a functional unit.

At 404, the thermal condition of VR 104 is evaluated with respect to a test criterion. In an embodiment, the test criterion is a temperature limit based on a temperature at which VR 104 is known to operate reliably. In an embodiment, the test criterion may be specified by a system designer and stored in a memory. In an embodiment, the test criterion or maximum temperature limit is different from the temperature at which a voltage regulator asserts a VRHOT signal to throttle a processor. For example, if a voltage regulator asserts VRHOT at temperature T, the test criterion may be 75% of T. It should be appreciated that this specific percentage is not essential; in various embodiments, the test criterion may be 65%, 70%, 78%, 83%, etc. In an embodiment, the test criterion is stored in BIOS 120 and provided to controller 102 at boot up. In an embodiment, the test criterion is stored in memory 212 and fetched by processor 210. An evaluation result or error value e(t) is generated by comparing each temperature reading with the test criterion. The evaluation result may indicate that the thermal condition of VR 104 is at, below, or above the test criterion. If the evaluation result is below the test criterion, power provided to one or more functional blocks in the domain may be allowed to increase. If the evaluation result is above the test criterion, power provided to at least one of the functional blocks in the domain is reduced.

At 406, a control value is generated. In various embodiments, the evaluation result or error value e(t) is input to a proportional/integral/derivative (PID) control mechanism, e.g., control loop 103, which generates the control value based on the input. The PID control mechanism includes proportional, integral, and derivative components, and a summing element that produces a weighted sum of the outputs of the three components to produce a control value or correction signal u(t).

At 408, the power used by a selected functional block is modified. Operation 408 includes selecting one or more functional blocks in domain 106 for power reduction. At least one functional block in domain 106 is not selected for power reduction. The selection process may be based on a priority scheme, as described herein. Operation 408 may also include determining how to reduce power, e.g., by reducing clock frequency, supply voltage, or both. To determine how much to adjust the clock frequency or voltage, a throttling ratio is applied to the control value generated by the PID control mechanism. The result may be either a clock or voltage signal adjustment parameter, or both. In an embodiment, power of the selected functional block is modified by providing a clock signal adjustment parameter to a clock generator providing a clock signal to the selected functional block. In an embodiment, power of the selected functional block is modified by providing a voltage signal adjustment parameter to the VR providing a voltage signal to the selected functional block. In some embodiments, power gating or isolation is used to reduce power. As shown by the arrow from block 408 to block 402, process 400 may be repeated at closely-spaced time intervals, e.g., every millisecond or every 500 microseconds.

Elements of embodiments (e.g., flowchart with reference to FIG. 4) are also provided as a machine-readable medium (e.g., memory 212) for storing the computer-executable instructions (e.g., instructions to implement any other processes discussed herein). In some embodiments, a computing platform comprises memory, a processor, machine-readable storage media (also referred to as tangible machine-readable medium), a communication interface (e.g., wireless or wired interface), and a network bus coupled together.

In some embodiments, the various logic blocks are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with the flow diagram of FIG. 4 (and/or various embodiments) and executed to implement embodiments of the disclosed subject matter may be implemented as part of an operating system or a specific application, component, program, object, module, routine, or other sequence of instructions or organization of sequences of instructions referred to as Pcode, "program software code/instructions," "operating system program software code/instructions," "application program software code/instructions," or simply "software" or firmware embedded in processor. In some embodiments, the program software code/instructions associated with the sequence flow diagrams of FIG. 4 (and/or various embodiments) are executed by the system or one or more components thereof.

In some embodiments, the program software code/instructions associated with reference to FIG. 4 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to FIG. 4 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 5:
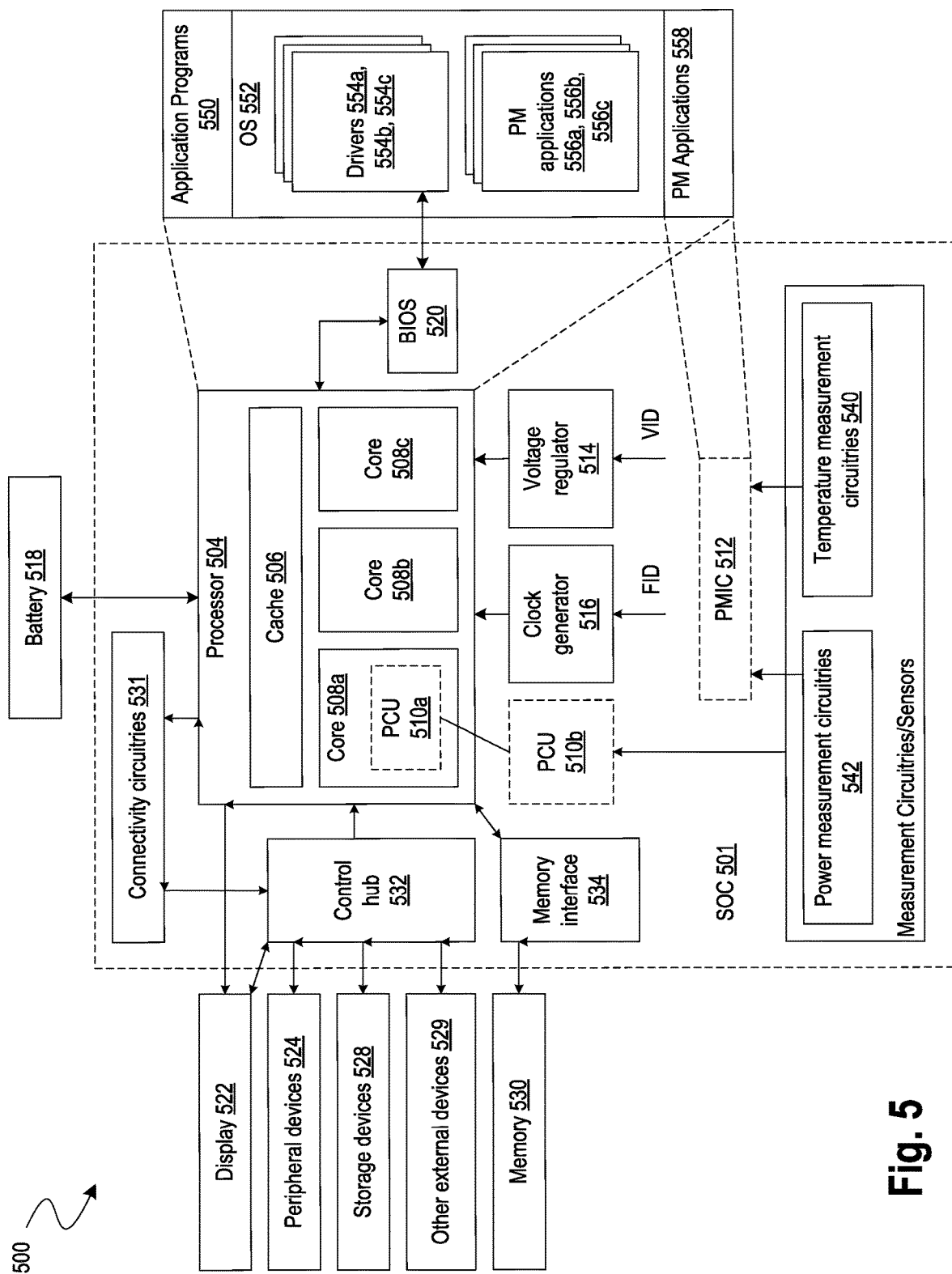
FIG. 5 illustrates a smart device or a computer system or an SoC with a capability for selectively changing power delivered to one or more functional blocks located in multiple power domains based on thermal conditions of multiple voltage regulators with some embodiments.

FIG. 5 illustrates a smart device or a computer system or an SoC (System-on-Chip) with a capability for selectively changing power delivered to one or more functional blocks located in multiple power domains based on thermal conditions of multiple voltage regulators with some embodiments. It is pointed out that those elements of FIG. 5 having the same reference numbers (or names) as the elements of any other figure can operate or function in any manner similar to that described, but are not limited to such.

In some embodiments, device 500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 500.

In an example, the device 500 comprises a SoC (System-on-Chip) 501. An example boundary of the SOC 501 is illustrated using dotted lines in FIG. 5, with some example components being illustrated to be included within SOC 501—however, SOC 501 may include any appropriate components of device 500.

In some embodiments, device 500 includes processor 504. Processor 504 can include one or more physical devices, such as microprocessors, application processors, microcontrollers, programmable logic devices, processing cores, or other processing means. The processing operations performed by processor 504 include the execution of an operating platform or operating system on which applications and/or device functions are executed. The processing operations include operations related to I/O (input/output) with a human user or with other devices, operations related to power management, operations related to connecting computing device 500 to another device, and/or the like. The processing operations may also include operations related to audio I/O and/or display I/O.

In some embodiments, processor 504 includes multiple processing cores (also referred to as cores) 508a, 508b, 508c. Although merely three cores 508a, 508b, 508c are illustrated in FIG. 5, the processor 504 may include any other appropriate number of processing cores, e.g., tens, or even hundreds of processing cores. Processor cores 508a, 508b, 508c may be implemented on a single integrated circuit (IC) chip. Moreover, the chip may include one or more shared and/or private caches, buses or interconnections, graphics and/or memory controllers, or other components.

In some embodiments, processor 504 includes cache 506. In an example, sections of cache 506 may be dedicated to individual cores 508 (e.g., a first section of cache 506 dedicated to core 508a, a second section of cache 506 dedicated to core 508b, and so on). In an example, one or more sections of cache 506 may be shared among two or more of cores 508. Cache 506 may be split in different levels, e.g., level 1 (L1) cache, level 2 (L2) cache, level 3 (L3) cache, etc.

In some embodiments, a given processor core (e.g., core 508a) may include a fetch unit to fetch instructions (including instructions with conditional branches) for execution by the core 508a. The instructions may be fetched from any storage devices such as the memory 530. Processor core 508a may also include a decode unit to decode the fetched instruction. For example, the decode unit may decode the fetched instruction into a plurality of micro-operations. Processor core 508a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 508a (for example) may be an out-of-order processor core in one embodiment. Processor core 508a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 508a may also include a bus unit to enable communication between components of the processor core 508a and other components via one or more buses. Processor core 508a may also include one or more registers to store data accessed by various components of the core 508a (such as values related to assigned app priorities and/or sub-system states (modes) association.

In some embodiments, device 500 comprises connectivity circuitries 531. For example, connectivity circuitries 531 includes hardware devices (e.g., wireless and/or wired connectors and communication hardware) and/or software components (e.g., drivers, protocol stacks), e.g., to enable device 500 to communicate with external devices. Device 500 may be separate from the external devices, such as other computing devices, wireless access points or base stations, etc.

In an example, connectivity circuitries 531 may include multiple different types of connectivity. To generalize, the connectivity circuitries 531 may include cellular connectivity circuitries, wireless connectivity circuitries, etc. Cellular connectivity circuitries of connectivity circuitries 531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 531 may include a network interface, such as a wired or wireless interface, e.g., so that a system embodiment may be incorporated into a wireless device, for example, cell phone or personal digital assistant.

In some embodiments, device 500 comprises control hub 532, which represents hardware devices and/or software components related to interaction with one or more I/O devices. For example, processor 504 may communicate with one or more of display 522, one or more peripheral devices 524, storage devices 528, one or more other external devices 529, etc., via control hub 532. Control hub 532 may be a chipset, a Platform Control Hub (PCH), and/or the like.

For example, control hub 532 illustrates one or more connection points for additional devices that connect to device 500, e.g., through which a user might interact with the system. For example, devices (e.g., devices 529) that can be attached to device 500 include microphone devices, speaker or stereo systems, audio devices, video systems or other display devices, keyboard or keypad devices, or other I/O devices for use with specific applications such as card readers or other devices.

As mentioned above, control hub 532 can interact with audio devices, display 522, etc. For example, input through a microphone or other audio device can provide input or commands for one or more applications or functions of device 500. Additionally, audio output can be provided instead of, or in addition to display output. In another example, if display 522 includes a touch screen, display 522 also acts as an input device, which can be at least partially managed by control hub 532. There can also be additional buttons or switches on computing device 500 to provide I/O functions managed by control hub 532. In one embodiment, control hub 532 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features).

In some embodiments, control hub 532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 522 represents hardware (e.g., display devices) and software (e.g., drivers) components that provide a visual and/or tactile display for a user to interact with device 500. Display 522 may include a display interface, a display screen, and/or hardware device used to provide a display to a user. In some embodiments, display 522 includes a touch screen (or touch pad) device that provides both output and input to a user. In an example, display 522 may communicate directly with the processor 504. Display 522 can be one or more of an internal display device, as in a mobile electronic device or a laptop device or an external display device attached via a display interface (e.g., DisplayPort, etc.). In one embodiment display 522 can be a head mounted display (HMD) such as a stereoscopic display device for use in virtual reality (VR) applications or augmented reality (AR) applications.

In some embodiments and although not illustrated in the figure, in addition to (or instead of) processor 504, device 500 may include Graphics Processing Unit (GPU) comprising one or more graphics processing cores, which may control one or more aspects of displaying contents on display 522.

Control hub 532 (or platform controller hub) may include hardware interfaces and connectors, as well as software components (e.g., drivers, protocol stacks) to make peripheral connections, e.g., to peripheral devices 524.

It will be understood that device 500 could both be a peripheral device to other computing devices, as well as have peripheral devices connected to it. Device 500 may have a "docking" connector to connect to other computing devices for purposes such as managing (e.g., downloading and/or uploading, changing, synchronizing) content on device 500. Additionally, a docking connector can allow device 500 to connect to certain peripherals that allow computing device 500 to control content output, for example, to audiovisual or other systems.

In addition to a proprietary docking connector or other proprietary connection hardware, device 500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 531 may be coupled to control hub 532, e.g., in addition to, or instead of, being coupled directly to the processor 504. In some embodiments, display 522 may be coupled to control hub 532, e.g., in addition to, or instead of, being coupled directly to processor 504.

In some embodiments, device 500 comprises memory 530 coupled to processor 504 via memory interface 534. Memory 530 includes memory devices for storing information in device 500. Memory can include nonvolatile (state does not change if power to the memory device is interrupted) and/or volatile (state is indeterminate if power to the memory device is interrupted) memory devices. Memory device 530 can be a dynamic random access memory (DRAM) device, a static random access memory (SRAM) device, flash memory device, phase-change memory device, or some other memory device having suitable performance to serve as process memory. In one embodiment, memory 530 can operate as system memory for device 500, to store data and instructions for use when the one or more processors 504 executes an application or process. Memory 530 can store application data, user data, music, photos, documents, or other data, as well as system data (whether long-term or temporary) related to the execution of the applications and functions of device 500.

Elements of various embodiments and examples are also provided as a machine-readable medium (e.g., memory 530) for storing the computer-executable instructions (e.g., instructions to implement any other processes discussed herein). The machine-readable medium (e.g., memory 530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 500 comprises temperature measurement circuitries 540, e.g., for measuring temperature of various components of device 500. In an example, temperature measurement circuitries 540 may be embedded, or coupled or attached to various components, whose temperature are to be measured and monitored. For example, temperature measurement circuitries 540 may measure temperature of (or within) one or more of cores 508*a*, 508*b*, 508*c*, voltage regulator 514, memory 530, a mother-board of SOC 501, and/or any appropriate component of device 500.

In some embodiments, device 500 comprises power measurement circuitries 542, e.g., for measuring power consumed by one or more components of the device 500. In an example, in addition to, or instead of, measuring power, the power measurement circuitries 542 may measure voltage and/or current. In an example, the power measurement circuitries 542 may be embedded, or coupled or attached to various components, whose power, voltage, and/or current consumption are to be measured and monitored. For example, power measurement circuitries 542 may measure power, current and/or voltage supplied by one or more voltage regulators 514, power supplied to SOC 501, power supplied to device 500, power consumed by processor 504 (or any other component) of device 500, etc.

In some embodiments, device 500 comprises one or more voltage regulator circuitries, generally referred to as voltage regulator (VR) 514. VR 514 generates signals at appropriate voltage levels, which may be supplied to operate any appropriate components of the device 500. Merely as an example, VR 514 is illustrated to be supplying signals to processor 504 of device 500. In some embodiments, VR 514 receives one or more Voltage Identification (VID) signals, and generates the voltage signal at an appropriate level, based on the VID signals. Various type of VRs may be utilized for the VR 514. For example, VR 514 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 510*a/b* and/or PMIC 512. In some embodiments, each core has a network of distributed LDOs to provide efficient control for power management. The LDOs can be digital, analog, or a combination of digital or analog LDOs.

In some embodiments, device 500 comprises one or more clock generator circuitries, generally referred to as clock generator 516. Clock generator 516 generates clock signals at appropriate frequency levels, which may be supplied to any appropriate components of device 500. Merely as an example, clock generator 516 is illustrated to be supplying clock signals to processor 504 of device 500. In some embodiments, clock generator 516 receives one or more Frequency Identification (FID) signals, and generates the clock signals at an appropriate frequency, based on the FID signals.

In some embodiments, device 500 comprises battery 518 supplying power to various components of device 500. Merely as an example, battery 518 is illustrated to be supplying power to processor 504. Although not illustrated in the figures, device 500 may comprise a charging circuitry, e.g., to recharge the battery, based on Alternating Current (AC) power supply received from an AC adapter.

In some embodiments, device 500 comprises Power Control Unit (PCU) 510 (also referred to as Power Management Unit (PMU), Power Controller, etc.). In an example, some sections of PCU 510 may be implemented by one or more processing cores 508, and these sections of PCU 510 are symbolically illustrated using a dotted box and labelled PCU 510*a*. In an example, some other sections of PCU 510 may be implemented outside the processing cores 508, and these sections of PCU 510 are symbolically illustrated using a dotted box and labelled as PCU 510*b*. PCU 510 may implement various power management operations for device 500. PCU 510 may include hardware interfaces, hardware circuitries, connectors, registers, etc., as well as software components (e.g., drivers, protocol stacks), to implement various power management operations for device 500.

In some embodiments, device 500 comprises Power Management Integrated Circuit (PMIC) 512, e.g., to implement various power management operations for device 500. In some embodiments, PMIC 512 is a Reconfigurable Power Management ICs (RPMICs) and/or an IMVP (Intel® Mobile Voltage Positioning). In an example, the PMIC is within an IC chip separate from processor 504. The PMIC 512 may implement various power management operations for device 500. PMIC 512 may include hardware interfaces, hardware circuitries, connectors, registers, etc., as well as software components (e.g., drivers, protocol stacks), to implement various power management operations for device 500.

In an example, device 500 comprises one or both PCU 510 or PMIC 512. In an example, any one of PCU 510 or PMIC 512 may be absent in device 500, and hence, these components are illustrated using dotted lines.

Various power management operations of device 500 may be performed by PCU 510, by PMIC 512, or by a combination of PCU 510 and PMIC 512. For example, PCU 510 and/or PMIC 512 may select a power state (e.g., P-state) for various components of device 500. For example, PCU 510 and/or PMIC 512 may select a power state (e.g., in accordance with the ACPI (Advanced Configuration and Power Interface) specification) for various components of device 500. Merely as an example, PCU 510 and/or PMIC 512 may cause various components of the device 500 to transition to a sleep state, to an active state, to an appropriate C state (e.g., CO state, or another appropriate C state, in accordance with the ACPI specification), etc. In an example, PCU 510 and/or PMIC 512 may control a voltage output by VR 514 and/or a frequency of a clock signal output by the clock generator, e.g., by outputting the VID signal and/or the FID signal, respectively. In an example, PCU 510 and/or PMIC 512 may control battery power usage, charging of battery 518, and features related to power saving operation.

The clock generator 516 can comprise a phase locked loop (PLL), frequency locked loop (FLL), or any suitable clock source. In some embodiments, each core of processor 504 has its own clock source. As such, each core can operate at a frequency independent of the frequency of operation of the other core. In some embodiments, PCU 510 and/or PMIC 512 performs adaptive or dynamic frequency scaling or adjustment. For example, clock frequency of a processor core can be increased if the core is not operating at its maximum power consumption threshold or limit. In some embodiments, PCU 510 and/or PMIC 512 determines the operating condition of each core of a processor, and opportunistically adjusts frequency and/or power supply voltage of that core without the core clocking source (e.g., PLL of that core) losing lock when the PCU 510 and/or PMIC 512 determines that the core is operating below a target performance level. For example, if a core is drawing current from a power supply rail less than a total current allocated for that core or processor 504, then PCU 510 and/or PMIC 512 can temporarily increase the power draw for that core or processor 504 (e.g., by increasing clock frequency and/or power supply voltage level) so that the core or processor 504 can perform at a higher performance level. As such, voltage and/or frequency can be increased temporality for processor 504 without violating product reliability.

In an example, PCU 510 and/or PMIC 512 may perform power management operations, e.g., based at least in part on receiving measurements from power measurement circuitries 542, temperature measurement circuitries 540, charge level of battery 518, and/or any other appropriate information that may be used for power management. To that end, PMIC 512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 510 and/or PMIC 512 in at least one embodiment to allow PCU 510 and/or PMIC 512 to manage processor core energy at least in part based on value(s) detected by one or more of the sensors.

Also illustrated is an example software stack of device 500 (although not all elements of the software stack are illustrated). Merely as an example, processors 504 may execute application programs 550, Operating System 552, one or more Power Management (PM) specific application programs (e.g., generically referred to as PM applications 558), and/or the like. PM applications 558 may also be executed by the PCU 510 and/or PMIC 512. OS 552 may also include one or more PM applications 556a, 556b, 556c.

The OS 552 may also include various drivers 554a, 554b, 554c, etc., some of which may be specific for power management purposes. In some embodiments, device 500 may further comprise a Basic Input/Output System (BIOS) 520. BIOS 520 may communicate with OS 552 (e.g., via one or more drivers 554), communicate with processors 504, etc.

For example, one or more of PM applications 558, 556, drivers 554, BIOS 520, etc. may be used to implement power management specific tasks, e.g., to control voltage and/or frequency of various components of device 500, to control wake-up state, sleep state, and/or any other appropriate power state of various components of device 500, control battery power usage, charging of the battery 518, features related to power saving operation, etc.

According to various embodiments, particular functional blocks of computer system 500 are assigned to power domains. Each power domain may be provided with a voltage regulator 514. According to various embodiments, the functional blocks in a power domain may be operated at a plurality of frequencies or a plurality of voltages. Temperature measurement circuitries 540 measure a thermal condition of a voltage regulator 514. In some embodiments, the measured thermal condition is provided to PCU 510b. In some embodiments, the measured thermal condition is provided to PCU 510a in core 508a. The thermal condition of voltage regulator 514 is evaluated by PCU 510 with respect to a test criterion. An evaluation result or error value e(t) is generated by comparing each thermal condition reading with the test criterion.

PCU 510 generates a control value. In various embodiments, the evaluation result or error value e(t) is input a proportional/integral/derivative (PID) control mechanism which generates the control value based on the input. The PID control mechanism includes proportional, integral, and derivative components, and a summing element that produces a weighted sum of the outputs of the three components to produce a control value or correction signal u(t).

PCU 510 modifies the power used by a selected functional block. Power may be modified by reducing clock frequency, supply voltage, or both. To determine how much to adjust the clock frequency or voltage, a throttling ratio is applied to the control value generated by the PID control mechanism. The result may be either a clock or voltage signal adjustment parameter. In an embodiment, PCU 510 modifies power of the selected functional block by providing a clock signal adjustment parameter to the clock generator providing a clock signal to the selected functional block. In an embodiment, PCU 510 modifies power of the selected functional block by providing a voltage signal adjustment parameter to the VR providing a voltage signal to the selected functional block.

Controller or power control unit 102, processor 210, and processor 504, and PCU 510 comprise one or more instances of a circuit or circuitry. As used herein, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processors. In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuits and circuitry can include two or more instances of circuitry. Circuits and circuitry may comprise a combination of hardware elements that cooperate to provide one or more functions. A particular instance of a circuits and circuitry may be referred to with a descriptive or non-descriptive label. For example, instances of circuits and circuitry that perform various functions may be referred to as receiver circuitry, processor circuitry, first circuit, or second circuit. Each of two or more instances of a circuit and circuitry can be comprised of distinct components. In addition, two or more instances of a circuit or circuitry can share one or more common components or resources.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a first circuit to be coupled to one or more thermal sensors, the first circuit to: receive from the one or more thermal sensors an indication of a thermal condition of a voltage regulator (VR) while circuitry comprising the VR is to regulate a delivery of power to a power domain, the power domain comprising a first component and a second component, wherein the circuitry is to control a first power consumption rate of the first component based on a first parameter, and is further to control a second power consumption rate of the second component based on a second parameter, and monitor the thermal condition, comprising the first circuit to generate an evaluation result based on a test criterion; and a second circuit coupled to receive from the first circuit a signal based on the evaluation result, wherein, based on the signal, the second circuit is to signal the circuitry to change the first parameter, wherein an amount of any change to the second parameter based on the evaluation result is different than an amount of a change to the first parameter based on the evaluation result.

Example 2: The apparatus of example 1, wherein the circuitry comprises a clock generator and the first parameter indicates a frequency of a clock signal to be provided to the first component.

Example 3: The apparatus of example 1, wherein the power domain includes a processor and the VR is configured to generate a processor throttle signal to indicate to the processor that the power domain is to transition to a lowest power state of a plurality of power states, and wherein, based on the evaluation result, the VR is to transition the processor to a power state other than the lowest power state.

Example 4: The apparatus of example 1, wherein the thermal condition of the VR is a temperature of the VR.

Example 5: The apparatus of example 4, wherein the power domain includes a processor and the VR is configured to generate a processor throttle signal to indicate to the processor that the power domain is to transition to a lowest power state of a plurality of power states, and wherein, based on the evaluation result, the second circuitry is to signal the one of the circuitry to change the second parameter, wherein an amount of any change to the first parameter based on the evaluation result is different than an amount of a change to the second parameter based on the evaluation result.

Example 6: The apparatus of example 4, wherein the power domain includes a processor and the VR is configured to generate a processor throttle signal to indicate to the processor that the power domain is to transition to a lowest power state of a plurality of power states, and wherein, based on the evaluation result, the VR causes the processor to remain in a power state other than the lowest power state.

Example 7: The apparatus of example 4, wherein the evaluation result indicates that a temperature of the VR is above a threshold temperature.

Example 8: The apparatus of example 7, wherein the power domain includes a processor and the VR is configured to generate a processor throttle signal to indicate to the processor that the power domain is to transition to a lowest power state of a plurality of power states, and wherein the VR is configured to generate the processor throttle signal after the temperature of the VR is above the threshold temperature for a threshold period of time.

Example 9: The apparatus of example 1, wherein the second circuit is to signal the circuitry to change the first parameter further based on a priority scheme according to which the first component has a lower priority than the second component.

Example 10: The apparatus of example 1, wherein the VR comprises a plurality of circuit devices, and wherein the thermal condition of the VR is a temperature of one of the plurality of circuit devices.

Example 11: The apparatus of example 1, wherein the first circuitry comprises a non-transitory computer-readable storage media having stored thereon Pcode instructions, and wherein the first circuitry to monitor the thermal condition comprises the first circuitry to execute the Pcode instructions.

Example 12: The apparatus of example 1, wherein an embedded controller comprises the first circuitry.

Example 13: The apparatus of example 1, wherein the first parameter indicates a voltage to be provided to the first component.

Example 14: The apparatus of example 3, wherein the test criterion is a threshold temperature.

Example 15: The apparatus of example 3, further comprising a BIOS to store the test criterion, wherein the BIOS identifies the test criterion to the first circuitry.

Example 16: A machine-readable storage media having machine-readable instructions stored thereon, that when executed, cause one or more machines to perform a method comprising: receiving an indication of a thermal condition of a voltage regulator (VR) while circuitry comprising the VR is regulating a delivery of power to a power domain, the power domain comprising a first component and a second component, wherein the circuitry is to control a first power consumption rate of the first component based on a first parameter, and is further to control a second power consumption rate of the second component based on a second parameter; generating an evaluation result based on a test criterion; signaling the circuitry to change the first parameter, wherein an amount of any change to the second parameter based on the evaluation result is different than an amount of a change to the first parameter based on the evaluation result.

Example 17: The machine-readable storage media of example 16, having machine-readable instructions stored thereon, that when executed, cause one or more machines to perform a method, wherein the method further comprises determining an amount of a change to the first parameter based on the evaluation result, wherein the first parameter indicates a frequency of a clock signal to be provided to the first component.

Example 18: The machine-readable storage media of example 16, having machine-readable instructions stored thereon, that when executed, cause one or more machines to perform a method, wherein the method further comprises determining an amount of a change to the first parameter based on the evaluation result, wherein the evaluation result is a difference between a threshold temperature and a temperature of the VR, and wherein the amount of change is proportional to the difference.

Example 19: A system comprising: a power domain comprising a first component and a second component; a first circuit to be coupled to one or more thermal sensors, the first circuit to: receive from the one or more thermal sensors an indication of a thermal condition of a voltage regulator (VR) while circuitry comprising the VR is to regulate a delivery of power to the power domain, wherein the circuitry is to control a first power consumption rate of the first component based on a first parameter, and is further to control a second power consumption rate of the second component based on a second parameter; the first circuit to monitor the thermal condition and to generate an evaluation result based on a test criterion; a second circuit coupled to receive from the first circuit a signal based on the evaluation result, wherein, based on the signal, the second circuit is to signal the circuitry to change the first parameter, wherein an amount of any change to the second parameter based on the evaluation result is different than an amount of a change to the first parameter based on the evaluation result; and the power domain comprising a display controller component and the system comprising a display device coupled with the display controller component.

Example 20: The system of example 19, wherein the circuitry comprises a clock generator and the first parameter indicates a frequency of a clock signal to be provided to the first component.

Example 21: The system of example 19, wherein the power domain includes a processor and the VR is configured to generate a processor throttle signal to indicate to the processor that the power domain is to transition to a lowest power state of a plurality of power states, and wherein, based on the evaluation result, the VR is to transition the processor to a power state other than the lowest power state.

Example 22: A method comprising: receiving an indication of a thermal condition of a voltage regulator (VR) while circuitry comprising the VR is regulating a delivery of power to a power domain, the power domain comprising a first component and a second component, wherein the circuitry is to control a first power consumption rate of the first component based on a first parameter, and is further to control a second power consumption rate of the second component based on a second parameter; generating an evaluation result based on a test criterion; signaling the circuitry to change the first parameter, wherein an amount of any change to the second parameter based on the evaluation result is different than an amount of a change to the first parameter based on the evaluation result.

Example 23: The method of example 22, wherein the method further comprises determining an amount of a change to the first parameter based on the evaluation result, wherein the first parameter indicates a frequency of a clock signal to be provided to the first component.

Example 24: The method of example 22, wherein the method further comprises determining an amount of a change to the first parameter based on the evaluation result, wherein the evaluation result is a difference between a threshold temperature and a temperature of the VR, and wherein the amount of change is proportional to the difference.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:
1. An apparatus comprising:
a first circuit to be coupled to one or more thermal sensors, the first circuit to:
receive from the one or more thermal sensors an indication of a thermal condition of a voltage regulator (VR) that is to regulate a delivery of power to a power domain, the power domain comprising a first component and a second component, and
monitor the thermal condition, comprising the first circuit to generate an evaluation result based on a test criterion; and
a second circuit coupled to receive from the first circuit the evaluation result, wherein the second circuit is to control a first power consumption rate of the first component based on a first parameter, and is further to control a second power consumption rate of the second component based on a second parameter, wherein, based on the evaluation result, the second circuit is to control the first power consumption rate to be reduced differently from the second power consumption rate.

2. The apparatus of claim 1, wherein the first parameter indicates a frequency of a clock signal to be provided to the first component.

3. The apparatus of claim 1, wherein the power domain includes a processor and the VR is configured to generate a processor throttle signal to indicate to the processor that the power domain is to transition to a lowest power state of a plurality of power states, and wherein, based on the evaluation result, the VR is to transition the processor to a power state other than the lowest power state.

4. The apparatus of claim 1, wherein the thermal condition of the VR is a temperature of the VR.

5. The apparatus of claim 4, wherein the power domain includes a processor and the VR is configured to generate a processor throttle signal to indicate to the processor that the power domain is to transition to a lowest power state of a plurality of power states, and wherein, based on the evaluation result, the second circuit is to signal the one of the circuitry to change the second parameter, wherein an amount of any change to the first parameter based on the evaluation result is different than an amount of a change to the second parameter based on the evaluation result.

6. The apparatus of claim 4, wherein the power domain includes a processor and the VR is configured to generate a processor throttle signal to indicate to the processor that the power domain is to transition to a lowest power state of a plurality of power states, and wherein, based on the evaluation result, the VR causes the processor to remain in a power state other than the lowest power state.

7. The apparatus of claim 4, wherein the evaluation result indicates that a temperature of the VR is above a threshold temperature.

8. The apparatus of claim 7, wherein the power domain includes a processor and the VR is configured to generate a processor throttle signal to indicate to the processor that the power domain is to transition to a lowest power state of a plurality of power states, and wherein the VR is configured to generate the processor throttle signal after the temperature of the VR is above the threshold temperature for a threshold period of time.

9. The apparatus of claim 1, wherein the second circuit is to change the first parameter based on a priority scheme according to which the first component has a lower priority than the second component.

10. The apparatus of claim 1, wherein the VR comprises a plurality of circuit devices, and wherein the thermal condition of the VR is a temperature of one of the plurality of circuit devices.

11. The apparatus of claim 1, wherein the second circuit comprises a non-transitory computer-readable storage media having stored thereon Pcode instructions, and wherein the second circuit is to execute the Pcode instructions.

12. The apparatus of claim 1, wherein an embedded controller comprises the second circuit.

13. The apparatus of claim 1, wherein the first parameter indicates a voltage to be provided to the first component.

14. The apparatus of claim 13, wherein the test criterion is a threshold temperature.

15. The apparatus of claim 13, further comprising a BIOS to store the test criterion, wherein the BIOS identifies the test criterion to the second circuit.

16. A non-transitory machine-readable storage media having machine-readable instructions stored thereon, that when executed, cause one or more machines to perform a method comprising:
receiving an indication of a thermal condition of a voltage regulator (VR) while circuitry comprising the VR is regulating a delivery of power to a power domain, the power domain comprising a first component and a second component, wherein the circuitry is to control a first power consumption rate of the first component based on a first parameter, and is further to control a second power consumption rate of the second component based on a second parameter;
generating an evaluation result based on a test criterion;
signaling the circuitry to change the first parameter to reduce the first power consumption rate based on the evaluation result, wherein an amount of any change to the second parameter based on the evaluation result is different than an amount of a change to the first parameter based on the evaluation result.

17. The non-transitory machine-readable storage media of claim 16, having machine-readable instructions stored thereon, that when executed, cause one or more machines to perform a method, wherein the method further comprises determining an amount of a change to the first parameter based on the evaluation result, wherein the first parameter indicates a frequency of a clock signal to be provided to the first component.

18. The non-transitory machine-readable storage media of claim 16, having machine-readable instructions stored thereon, that when executed, cause one or more machines to perform a method, wherein the method further comprises determining an amount of a change to the first parameter based on the evaluation result, wherein the evaluation result is a difference between a threshold temperature and a temperature of the VR, and wherein the amount of change is proportional to the difference.

19. A system comprising:
a power domain comprising a first component and a second component;
a first circuit to be coupled to one or more thermal sensors, the first circuit to:
receive from the one or more thermal sensors an indication of a thermal condition of a voltage regulator (VR) that is to regulate a delivery of power to the power domain, and
monitor the thermal condition, comprising the first circuit to generate an evaluation result based on a test criterion; and
a second circuit coupled to receive from the first circuit the evaluation result, wherein the second circuit is to control a first power consumption rate of the first component based on a first parameter, and is further to control a second power consumption rate of the second component based on a second parameter, wherein, based on the evaluation result, the second circuit is to control the first power consumption rate to be reduced differently from the second power consumption rate; and
the power domain comprising a display controller component and the system comprising a display device coupled with the display controller component.

20. The system of claim 19, wherein the circuitry comprises a clock generator and the first parameter indicates a frequency of a clock signal to be provided to the first component.

21. The system of claim 20, wherein the power domain includes a processor and the VR is configured to generate a processor throttle signal to indicate to the processor that the power domain is to transition to a lowest power state of a plurality of power states, and wherein, based on the evaluation result, the VR is to transition the processor to a power state other than the lowest power state.

\* \* \* \* \*